United States Patent [19]

Southward

[11] Patent Number: 4,460,908

[45] Date of Patent: Jul. 17, 1984

[54] PRINTING APPARATUS

[75] Inventor: David C. Southward, Old Thatch, England

[73] Assignee: Sinclair Research Limited, Cambridge, England

[21] Appl. No.: 350,828

[22] Filed: Feb. 22, 1982

[30] Foreign Application Priority Data

Feb. 26, 1981 [GB] United Kingdom ................. 8106050

[51] Int. Cl.³ ............................................. G01D 15/06

[52] U.S. Cl. ..................................... 346/155; 346/163

[58] Field of Search ................ 346/139 A, 153.1, 155, 346/163

[56] References Cited

U.S. PATENT DOCUMENTS 2,961,287 11/1960 Zabriskie et al. ............... 346/163 X 3,810,189 5/1974 Casperson et al. ................. 346/155

3,855,600 12/1974 Potma ................................ 346/155

4,148,042 4/1979 Mutton et al. ....................... 346/155

*Primary Examiner*—Thomas H. Tarcza

*Attorney, Agent, or Firm*—Laubscher, Philpitt & Laubscher

[57] ABSTRACT

Printing apparatus for use with electrosensitive paper includes a scanning means in the form of an endless belt 11 suspended between pulleys 13, 14 and carrying writing styli 17. The styli are scanned across the paper 15 as the belt rotates and writing signals are applied from a control circuit 24 via a conductor strip 19 to the stylus which is in contact with the paper. Stylus guiding surfaces 20, 21 are provided to keep the stylus running along a straight edge, and position signals are generated by a transducer 27, such as an optical encoder, so as to synchronize the writing signals.

11 Claims, 5 Drawing Figures

PRINTING APPARATUS

BRIEF DESCRIPTION OF THE PRIOR ART

The present invention relates to printing apparatus of the type which uses electrosensitive paper, such apparatus being particularly suitable for use in providing computer print-outs.

The electrosensitive paper includes a dark coloured or black lacquer coating on the paper, and a metallizing layer covering the lacquer coating, the metallizing being formed of a volatile metal such as aluminium or cadmium deposited in a layer of the order of 0.1μ thickness. The printing action is generated by burning off portions of the layer of metallizing on the paper using an electric discharge. This can be achieved by scanning a writing stylus over the surface of the paper, the stylus being connected to an electrical potential relative to the metallizing on the paper. The resulting current then evaporates the metal in the vicinity of the stylus tip where the current density is very high, and this exposes the dark coloured or black lacquer underneath thereby providing a permanent trace contrasting with the colour of the metallizing layer. This printing action, which can be termed "burn out", is a very rapid process lasting only a few microseconds, so that this can form the basis of a very fast method of printing.

SUMMARY OF THE INVENTION

The object of the invention is to provide improved apparatus of this type in which one or more writing styli are guided across the paper with a high degree of precision in terms of repeatability and accuracy of trace, such apparatus being relatively simple and inexpensive to produce.

The present invention provides printing apparatus for use with electrosensitive paper, said apparatus comprising a paper feed mechanism for feeding electrosensitive paper past a scanning position, scanning means carrying at least one writing stylis and being arranged to traverse the stylus across the scanning position, guide means for maintaining the stylus in registration as it traverses the scan, and signal generating means for generating writing signals to the stylus in dependence on its position during each scan.

In the preferred apparatus, the scanning means is in the form of an endless belt suspended between belt guiding means such as a pair of pulleys. Preferably, two styli are carried by the belt and repeatedly scan alternate lines on the paper with rotation of the belt, means being provided to synchronize rotation of the belt with the paper feed mechanism.

BRIEF DESCRIPTION OF THE DRAWING

In order that the present invention may be more readily understood, an embodiment thereof will now be described, by way of example, with reference to the accompanying drawings, in which.

DETAILED DESCRIPTION

Figure 1:
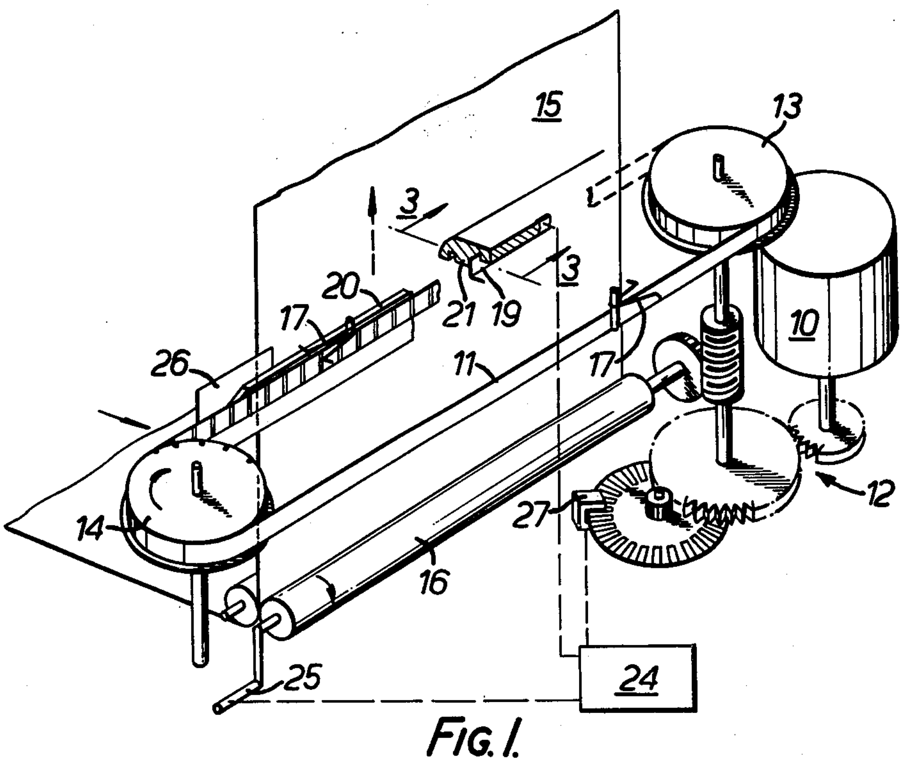
FIG. 1 shows a partly schematic perspective view of important features of the preferred embodiment, with certain parts cut away for increased clarity.
Figure 2:
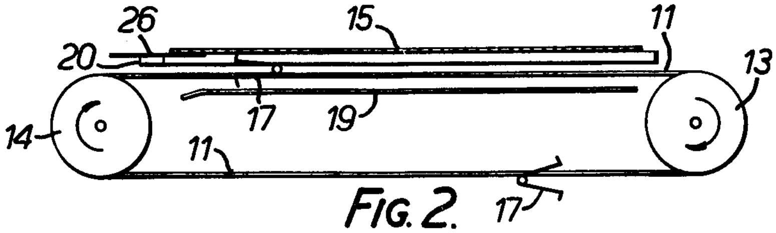
FIG. 2 is a plan view of part of FIG. 1.

Referring to the drawings, and specifically to FIG. 1, there is shown printing apparatus including a preferred stylus guidance means in the form of an endless belt carrying the writing stylus, and means for maintaining registration and alignment of the stylus as the belt guides it across the paper. The apparatus includes a motor 10 which is arranged to drive an endless belt 11 by means of suitable gearing 12 connected to a drive pulley 13. The belt 11 is preferably made of a light synthetic plastic material and may, but need not, be toothed to improve grip by the drive pulley 13. An idler pulley 14 is provided so as to support the belt 11 between itself and the drive pulley 13 in such a way that one side of the belt runs in front of a sheet of electrosensitive paper 15. Rollers 16, also driven via the gearing 12, cause the paper to be moved past the belt 11.

Figure 3:
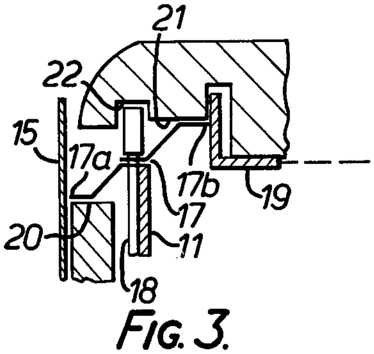
FIG. 3 is an enlarged sectional view along line 3—3 of FIG. 1.

The belt 11 carried one or more writing styli (two being shown), each of which is in the form of a two-pronged hairspring 17 being attached to the belt by means of a pin 18 integrally moulded with the belt (see FIG. 3). Each hairspring 17 is therefore towed across the paper 15 by movement of the belt 11. The tips of each hairspring 17 are turned so that one tip 17*a* forms the stylus point which contacts the paper normally to the plane of the paper and the other tip 17*b* contacts a conductor strip 19 for transferring a writing signal from the strip 19 to the stylus point 17*a* and thence to the paper. The writing pressure between the stylus and the paper, preferably between 1 and 10 grams, is generated by compression of the hairspring 17 between the conductor strip 19 and paper 15. However, the line of action of the two tips 17*a*, 17*b* is at such an angle that they are respectively biased towards guide surfaces 20, 21 on the frame (shown in more detail in FIG. 3). Surface 20 is arranged to guide the stylus tip 17*a* across the paper and surface 21 is arranged to guide the tip 17*b* to contact the conductor strip 19 and to provide an effective vertical compression effect between the two tips so as to improve registration of the stylus tip 17*a* with the paper. The stylus is otherwise free to swivel and rotate on the pin 18 provided on the belt 11, and is therefore drawn along a reference straight edge on the paper 15 without any of the biasing force being taken in reaction by the belt. A further preferred feature is the provision of a grooved surface 22 in which the belt pin 18 can travel across the width of the paper so that lateral displacement of the belt does not produce horizontal modulation of the writing tip.

A control circuit, schematically shown as block 24, is connected between the conductor strip 19 and a conductor arrangement 25 connected to the metallizing on the paper, such as by the provision of conductive surfaces on the rollers 16. Writing signals, for example at 40 volts D.C., are then applied between the conductor strip 19 (and hence the stylus tip 17*a*) and the conductor arrangement 25 (and hence the metallizing on the paper 15) and, as the stylus traverses the paper, a series of dots is "burnt out" of the paper at required locations.

It will be seen that the arrangement thus far described ensures that a series of parallel lines can be drawn on the paper which is being continually winched from the roll by the rollers 16. It further remains to synchronize the writing signals for one line with those for other lines so that vertical registration of characters being printed can be maintained.

In order to synchronize the start of each line, the writing tip 17*a* is prevented from contacting the first few millimeters of paper by means of a thin insulated foil 26. As soon as the writing tip 17*a* drops off this foil, it contacts the metallized surface of the paper 15 and an electrical signal is generated and detected by the control circuit 24. Now while the stylus is being drawn across the paper, its progress is measured by a transducer 27 such as an optical encoder which provides positional signals to the control circuit 24. It is desirable that the signal produced by this transducer has a higher resolution than that finally required. For example, if it is required that each line should be resolvable into 256 dots, then the transducer 27 should generate, say, 1024 dots. When this signal is gated with the paper contact signal and divided down by 4, then the register of each line should not be out by more than a quarter of the width of a dot. In this way, mechanically dissimiliar styli should generate substantially identical traces.

As a further refinement to cater for the possibility of eccentric pulleys, gears or transducers etc., it is highly desirable that, at the beginning of each line when the synchronizing signal is generated, the belt pulleys 13, 14 should be in the same relative position and that the transducer 27 also indicates the same relative position irrespective of the writing stylus adopted.

These two stipulations are satisfied, firstly, by ensuring that the spacing between adjacent styli is equal to an integer (which may equal one) multiple of the circumference of a pulley, and secondly by arranging the gearing 12 such that each rotation of the pulley 13 provides an integer multiple number of rotations of the transducer disc. The relative positions of these components will therefore be maintained constant at the start of each line. Thus, whereas eccentric pulleys would give a variation in the dot spacing across the paper width, at least that variation would be repeated on each line so that characters printed from the dots would be vertically registered and hence present a consistent appearance.

Figure 4:
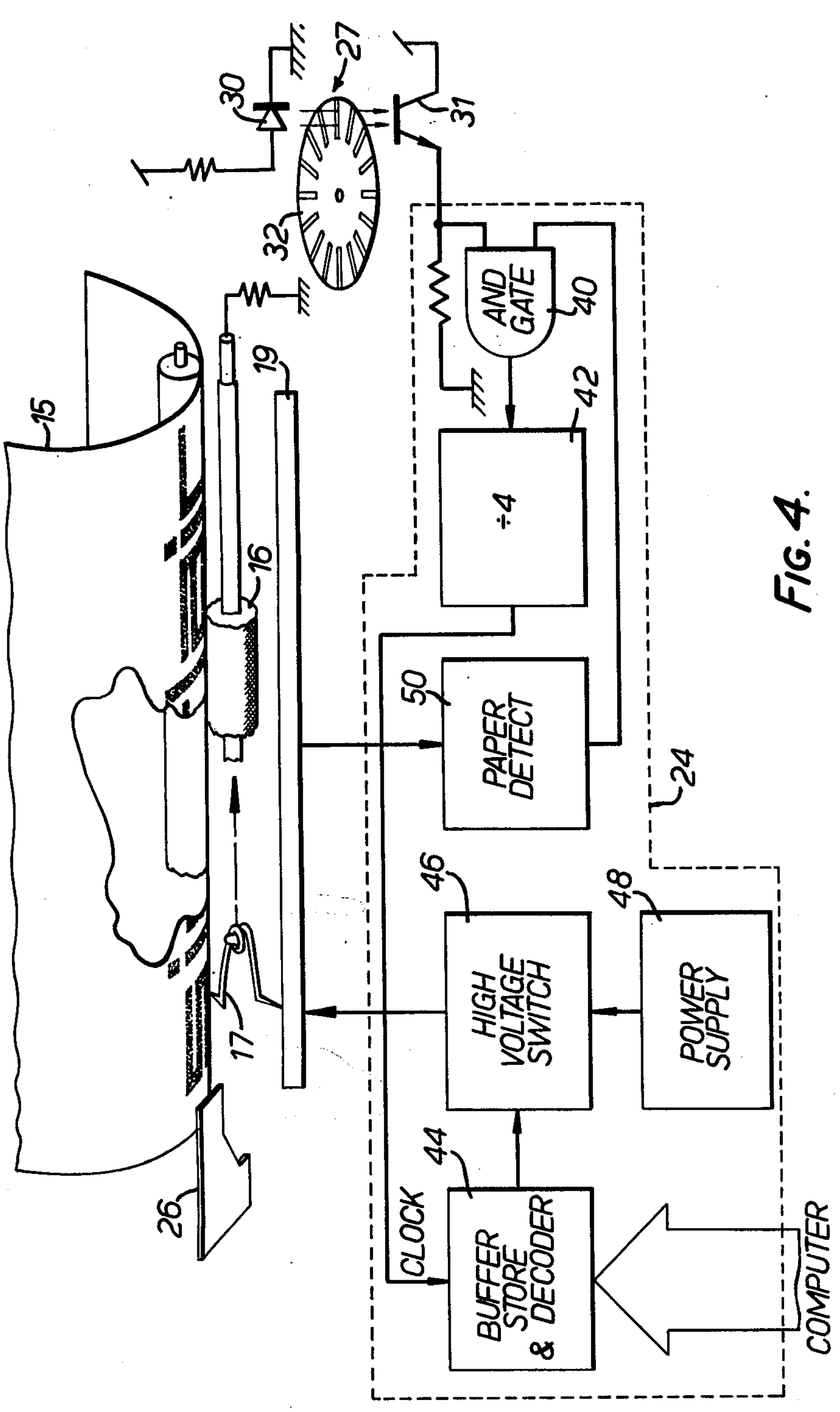
FIG. 4 is a block diagram of the control circuit of FIG. 1.

Referring to FIG. 4, the control circuit 24 is shown in greater detail, together with certain parts of the printing apparatus already described. The transducer 27 is a light sensitive device comprising a light emitting diode 30 arranged to direct a beam of light on to a light responsive element shown as a phototransistor 31. The beam of light is interrupted by an apertured disc 32 driven by the gearing 12 of FIG. 1, so as to provide a pulsed signal, the timing of the pulses depending on the speed of rotation of the disc 32. The pulsed signal is applied to one input of an AND-gate 40 whose output is connected via a divide-by-four circuit 42 to a block input of a buffer store and decoder 44. The buffer store and decoder 44 receives and stores printing information (e.g. in respect of one scanned line or preferably in respect of one line of print, in other words, a number of scanned lines) from suitable ancilliary equipment, for example a computer as shown. The buffer store and decoder 44 is responsive to clock pulses at its clock input to selectively enable a high voltage switch 46 to permit current to flow from a power supply 48 (e.g. providing 40–50 V) to the conductor strip 19 and thence via the hairspring 17 to the paper 15. A return current path is provided via the roller 16 having a conductive surface and being connected to earth (ground) via a resistor.

The conductor strip 19 is also connected to a paper detect circuit 50 which provides an indication when the hairspring 17 runs off the insulating foil 26 and on to the paper. The output of the paper detect circuit 50 is connected to the second input of the AND-gate 40.

Figure 5:
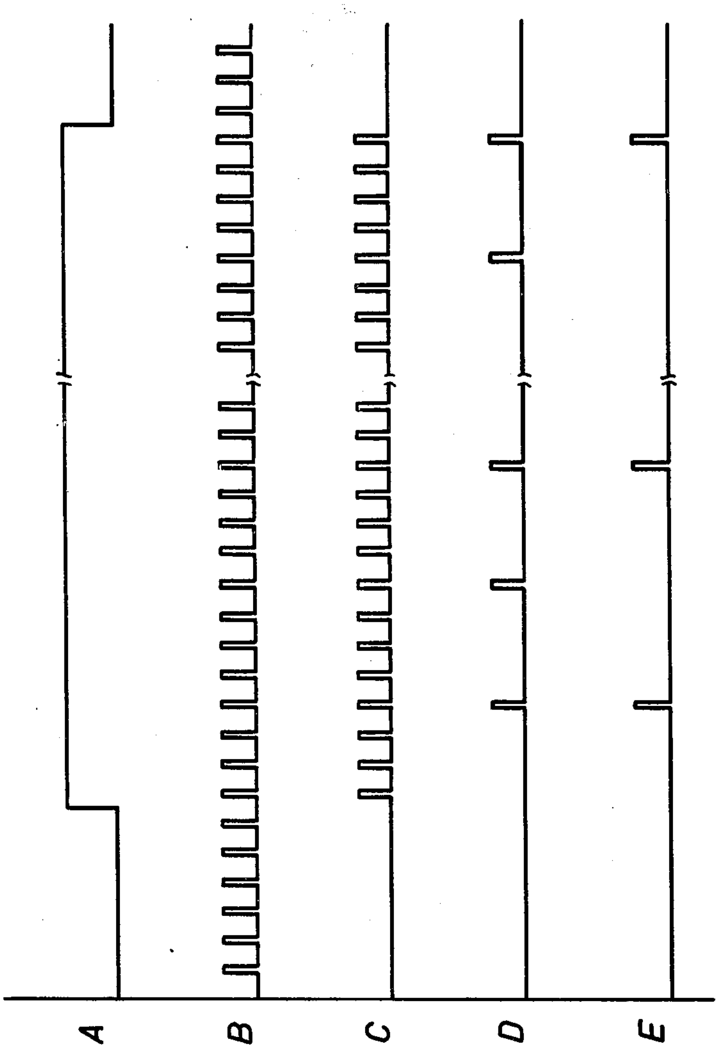
FIG. 5 is a waveform diagram of signals appearing in the circuit of FIG. 4.

The operation of the control circuit 24 will now be described with reference to the waveform diagram of FIG. 5.

Waveform A represents the output of the paper detect circuit 50; as shown, the waveform remains "low" until the hairspring 17 runs off the insulating foil and makes contact with the paper thus generating an electrical signal and raising the level of the output waveform to "high".

Waveform B represents the output of the transducer 27; every time an aperture of the rotating disc 32 allows light from the light emitting diode 30 to be directed on to the phototransistor 31, a pulse is produced.

Waveform C represents the output of the AND-gate 40 which has waveforms A and B fed as inputs thereto. The pulsed waveform B is produced at the output of AND-gate 40 only when the gate is held open by a "high" waveform (A) at its other input. Since the transducer 27 is arranged to provide a constant number of pulses in a single line scan of the stylus by virtue of the mechanical coupling via gearing 12, that number being exemplified as 1024 above, waveform C will always provide that number of pulses, although the timing therebetween will depend on the degree of constancy of motor rotation. It will therefore be seen that this arrangement provides synchronization between the pulses of waveform C and the position of the stylus on the paper, the relative timing being thus synchronized and the absolute timing being unimportant.

Waveform D represents the output of the divide-by-four circuit 42, which provides an output pulse for every fourth pulse of the input waveform C. The thus divided pulse waveform is used to clock the buffer store and decoder 44, and in the above-mentioned example, the number of clock pulses per line scan will be 256. Information from the computer is held in the buffer store, and for each clock, pulse, a signal indicative of printing will be read out of the store. Thus, if a "dot" is required, the output of the store will be "high" enabling the switch 46 and current will flow to the stylus; conversely if no "dot" is to be printed, the output of the store stays "low" and the switch 46 prevents current from flowing to the stylus. Waveform E represents a typical output of the buffer store and decoder 44; it will be seen that in this example, for the first, third and last clock signals of waveform D, a "dot" is required in accordance with the information held in the store, whereas for the second and penultimate clock signals, no "dot" is required.

The apparatus as previously described includes two writing styli provided on the belt. This is a particularly convenient arrangement and is presently preferred; however, any number of styli could be provided on the belt depending on the particular application, as long as the spacing between adjacent styli is not less than a required line scan.

What is claimed is:

1. Printing apparatus for use with electrosensitive paper, comprising (a) a frame;

(b) paper feed means (16) for feeding the electrosensitive paper past a scanning position on said frame;

(c) scanning means including (1) at least one resilient conductive stylus member (17); and (2) means for displacing said stylus member across said scanning position, including an endless belt (11), means (13, 14) supporting said belt for endless movement across said scanning position, and means (12) for driving said belt in synchronism with said paper feed means, thereby to produce repeated scanning of lines by said stylus member on said paper upon movement of said belt;

(d) guide means (20, 21) for maintaining said stylus member in registration with the paper during movement of the stylus across the scan; and (e) signal generating means (24) for supplying writing signals to the stylus member in dependence on the position of the stylus member during each scan, said signal supplying means including a conductor element (19) adjacent and parallel with said guide means, said stylus member being guided and biased under compression between said guide means and said conductor element.

2. Printing apparatus as claimed in claim 1, wherein said belt carries two writing styli operable to traverse alternate scanned lines of said paper.

3. Printing apparatus according to claim 1, wherein said stylus member is attached to said belt by means of a mounting projection provided on said belt, and said stylus member includes two contact tips, one of which bears on said paper and the other of which bears on said conductor element.

4. Printing apparatus as claimed in claim 3, wherein said guide means comprises upper and lower guide surfaces extending parallel to the required stylus scanning movement, the line of action of said contact tips of said stylus member being angled so as to be biased towards said guide surfaces and to bear thereon during scanning movement, thereby to improve registration of stylus scanning.

5. Printing apparatus as claimed in claim 3, wherein said guide means further comprises a groove for receiving said mounting projection on said belt when said stylus is in the scanning position, thereby to prevent horizontal modulation of said stylus by constraining said mounting projection to run within said groove during scanning.

6. Printing apparatus as claimed in claim 1, further including a paper detect circuit responsive to a signal being generated when said stylus contacts said paper, said paper detect circuit acting to initiate generation of said writing signals.

7. Printing apparatus as claimed in claim 6, further including an insulating member partially overlapping a portion of said paper so as to prevent said stylus contacting said paper over that portion thereof.

8. Printing apparatus as claimed in claim 1, and further including drive means for driving said paper feed means and said scanning means in synchronism; and transducer means associated with said drive means for providing position signals to said signal generating means.

9. Printing apparatus as claimed in claim 6, and further including drive means (10) for driving said paper feed means and said scanning means in synchronism; and transducer means (27) associated with said drive means for providing position signals to said signal generating means, said transducer means being gated with said signal from said paper detect circuit, thereby to provide a signal indicative of stylus position on said paper.

10. Printing apparatus as claimed in claim 8, wherein said endless belt support means includes pulleys at either end thereof, and said drive means includes a gearing arrangement such that when the stylus is at the beginning of each scan, said pulleys are in the same relative position.

11. Printing apparatus as claimed in claim 10, wherein said transducer is responsive to rotation of a disc driven by said gearing arrangement, such that when said stylus is at the beginning of each scan, said transducer is in the same relative position.

* * * * *